United States Patent
Romanenko

(10) Patent No.: US 10,340,713 B2
(45) Date of Patent: Jul. 2, 2019

(54) DEDICATED USB POWER PORTS COUPLED WITH A MULTI-PORT USB POWERED HUB

(71) Applicant: Paul Andrew Romanenko, Boynton Beach, FL (US)

(72) Inventor: Paul Andrew Romanenko, Boynton Beach, FL (US)

( * ) Notice: Subject to any disclaimer, the term of this patent is extended or adjusted under 35 U.S.C. 154(b) by 224 days.

(21) Appl. No.: 15/255,875

(22) Filed: Sep. 2, 2016

(65) Prior Publication Data

US 2016/0372951 A1 Dec. 22, 2016

Related U.S. Application Data

(63) Continuation of application No. 13/270,912, filed on Oct. 11, 2011.

(51) Int. Cl.
*H02J 7/00* (2006.01)
*G06F 13/42* (2006.01)

(52) U.S. Cl.
CPC ........ *H02J 7/0052* (2013.01); *G06F 13/4282* (2013.01); *H02J 2007/0062* (2013.01); *H02J 2007/0096* (2013.01)

(58) Field of Classification Search
CPC .......................... G06F 1/266; H02J 2007/0062
USPC .................................................. 320/107, 128
See application file for complete search history.

(56) References Cited

U.S. PATENT DOCUMENTS

| 7,320,077 | B2 | 1/2008 | Kim |
| 7,623,355 | B2 | 11/2009 | Lambert et al. |
| RE42,385 | E | 5/2011 | Wong et al. |
| 8,312,199 | B2 * | 11/2012 | Johnson ............... G06F 13/4022 710/16 |
| 2006/0020736 | A1 | 1/2006 | Jackson |
| 2008/0007212 | A1 | 1/2008 | Theytaz et al. |
| 2011/0025262 | A1 | 2/2011 | Fischer et al. |
| 2011/0043162 | A1 | 2/2011 | Lee et al. |
| 2011/0057604 | A1 * | 3/2011 | Capella ................. H02J 7/0004 320/107 |
| 2011/0140652 | A1 | 6/2011 | Chandran |
| 2012/0166173 | A1 | 6/2012 | Fischbach |

OTHER PUBLICATIONS

Remple, "Battery Charging Specifications," www.usb.org/developerskleyclass_docs/batt_charging_1_1.zip, Revision 1.1, Apr. 15, 2009 , pp. 1-3, 6-13, 22,29.

* cited by examiner

*Primary Examiner* — Zixuan Zhou

(74) *Attorney, Agent, or Firm* — Akerman LLP; Peter A. Chiabotti

(57) ABSTRACT

A dedicated power port (DPP) providing 1 Amp (A) or more of current enables a user to charge mobile tablet and communication like devices (TCD) without the use of additional software or circuitry. The DPP is coupled with a multi-port USB powered hub (MPH), the user can simultaneously charge TCDs via the dedicated port while peripheral devices, which are connected to non-dedicated USB ports, continue to function within industry specifications. Thereby addressing a limitation for viable charging solutions of modern day TCDs while simultaneously retaining the functionality and convenience of a MPH, all in one embodiment.

20 Claims, 3 Drawing Sheets

DEDICATED USB POWER PORTS COUPLED WITH A MULTI-PORT USB POWERED HUB

CROSS-REFERENCE TO RELATED APPLICATIONS

This application is a continuation of U.S. patent application Ser. No. 13/270,912, filed on Oct. 11, 2011, the entirety of which is incorporated herein by reference.

BACKGROUND

The patent field is related to the charging of portable electronic devices via a multi-port Universal Serial Bus (USB) powered hub. Considering USB properties as discussed in Terry Remple's document Battery Charging Specifications revision 1.1 Apr. 15, 2009, ports use differential data pins, referred to as D+ and D−, to determine if a device is connected to a USB port. In addition, the differential data pins are used to establish and maintain communications or data transfer (hereafter referred to as communications) between peripheral devices and to determine if a port is empty. Typically detection is achieved by utilizing the D+ and D− pins (hereafter, referred to as data pins) together rather than independently. Thus multi-port USB powered hubs provide 0.5 Amp (A) (USB 2.0), or 0.9 A (USB 3.0), of charging current to each port. In contrast, unpowered hubs must be connected to a host apparatus to provide 0.5 A of charging current, which is shared across all ports. Present day mobile tablet and communication like devices (hereafter, referred to as TCD), for example; IPhone, IPad, Slate, Galaxy, Rim, BlackBerry, specify 1 A or more of current on each individual USB port to charge effectively. Previous USB hubs do not satisfy the specification of 1 A or more of charging current, without the intervention of additional software or circuitry. Thus a limitation of readily available charging options which include communications between peripherals (mouse, keyboard, printer) is created. The following is a tabulation of some prior art that is relevant to these limitations:

PATENTED REFERENCES

| Patent # | Kind Code | Issue Date | Patentee |
|---|---|---|---|
| US RE42,385 | E | 2011 May 24 | Wong et al. |
| US 2011/0025262 | A1 | 2011 Feb. 3 | Fischer et al. |
| U.S. Pat. No. 7,623,355 | B2 | 2009 Nov. 24 | Lambert et al. |
| U.S. Pat. No. 7,320,077 | B2 | 2008 Jan. 15 | Kim |
| US 2008/0007212 | A1 | 2008 Jan. 10 | Theytaz et al. |

NON-PATENTED LITERATURE DOCUMENTS

| Author | Title | Revision | Date of Publication |
|---|---|---|---|
| Terry Remple | Battery Charging | Revision 1.1 | Apr. 15, 2009 |

U.S. Pat. No. 7,320,077B2, Power Supply Controlling Apparatus of a Device Connected to a Serial Bus, by Kim, which depicts the normal functionality of a USB hub and active data pins. However, because of the 0.5 A USB output, it will not be able to effectively charge present day TCDs. A similar occurrence is evident in U.S. Pat. No. RE42,385E, Universal USB Charging Accessory, by Wong et al., and U.S. Pat. No. 7,623,355B2, Extended Universal Serial Bus Connectivity, by Lambert et al. Although both have data pin communications but not the essential proprietary software installation, the USB ports do not provide 1 A or more of current nor recognize present day TCDs. Charging devices satisfying the current specifications of TCDs through hardware and/or profiles, such as US Patent #2011/0025262A1, Multifunctional Charging System and Method, by Fisher et al. and US Patent #2008/0007212A1, Universal Charger, by Theytaz et al., do not provide the data communications functionality between peripherals, network devices, or computers.

BRIEF SUMMARY OF INVENTION

Dedicated Universal Serial Bus (USB) power ports coupled with a multi-port USB powered hub comprise of at least one dedicated USB power port and one or more non-dedicated USB ports with the functionality of a multi-port USB powered hub (hereafter, referred to as a MPH).

A dedicate USB power port (hereafter, referred to as DPP) solely used for providing charging current to a device is created by disabling communication and data transfer (communications) between the connected device and the USB port. It is configured by removing the D+ and D− pins (data pins) from the circuit board and re-soldering them in a crossed manner inside the USB port housing, effectively shorting them. Thus eliciting an output of 1 Amp (A) or more of current.

The process of combining the DPP with a MPH enables users to fulfill a requirement of providing 1 A or more of current for charging mobile tablet and communication like devices (TCD), consideration for legacy devices, and utilizing the MPH functionality for peripheral communications. All within one embodiment.

DETAILED DESCRIPTION

Considering the various types of Universal Serial Bus (USB) ports, the basic properties of a port pin configuration, contains four pins which are used when a device is connected to a USB port. The first pin provides current (power) to the USB port and subsequently any device connected to the port. Pin 2 and pin 3 are differential data pins (data pins) often referred to as D+ and D− used when communication and data transfer (communications) takes place between the USB port and a connected device. The fourth pin is the ground or current return for the port.

Figure 1:
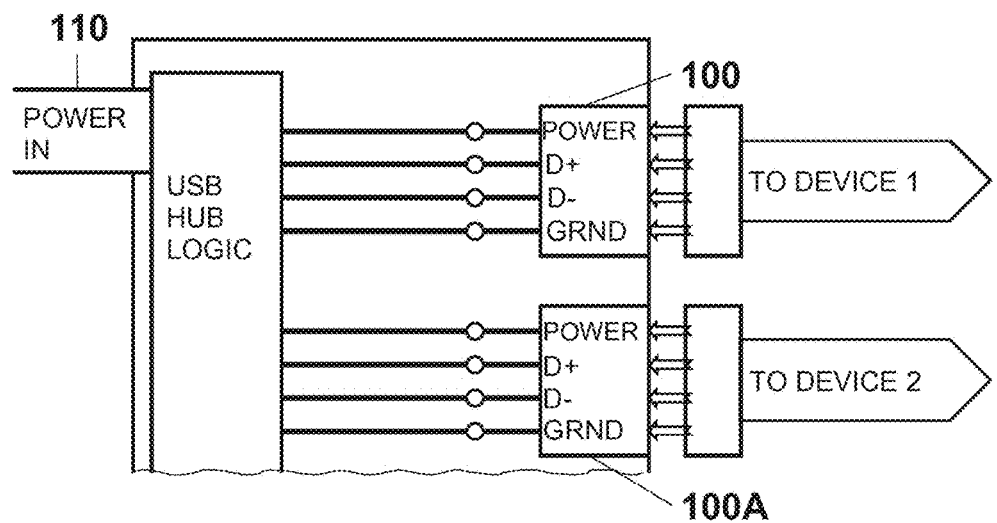
FIG. 1 (Prior art) Multi-port USB powered hub without dedicated power ports

Multi-port USB powered hubs (MPH) contain a plurality of USB ports in their entirety. FIG. 1 (prior art) illustrates two identical ports 100,100A. Through each USB port data and current are able to actively flow between the port and connected device. USB ports use the data pins to determine if a device is connected to a USB port, establish and maintain communications with peripheral devices (mouse, keyboard, printer), and determine if the port is empty. Typically the determination is achieved by utilizing the data pins together rather than independently. MPHs power adaptors (power in 110) provide 0.5 Amps (A) (via USB 2.0) and 0.9 A (via USB 3.0) of current to all ports for charging of a device.

In contrast unpowered hubs must be connected to a host apparatus which share 0.5 A of charging current across all ports (not illustrated). Present day technology such as mobile tablet and communication like devices (TCD) specify 1 A or more of current on the individual USB port to charge effectively. To charge devices with these limitations in place, additional circuitry or special software must be installed on a host apparatus to allow the ports to charge the device. If the software is not present, the device will not charge. The alternative option of using a wall charger often times is not feasible nor convenient:

As a detailed illustration, when a TCD is connected to the USB port 100, a handshake occurs between the host device and TCD. The handshake determines the maximum current available to charge the device. Due to communications taking place via the data pins, sufficient current will not be provided without the intervention of installed software or circuitry.

Figure 2:
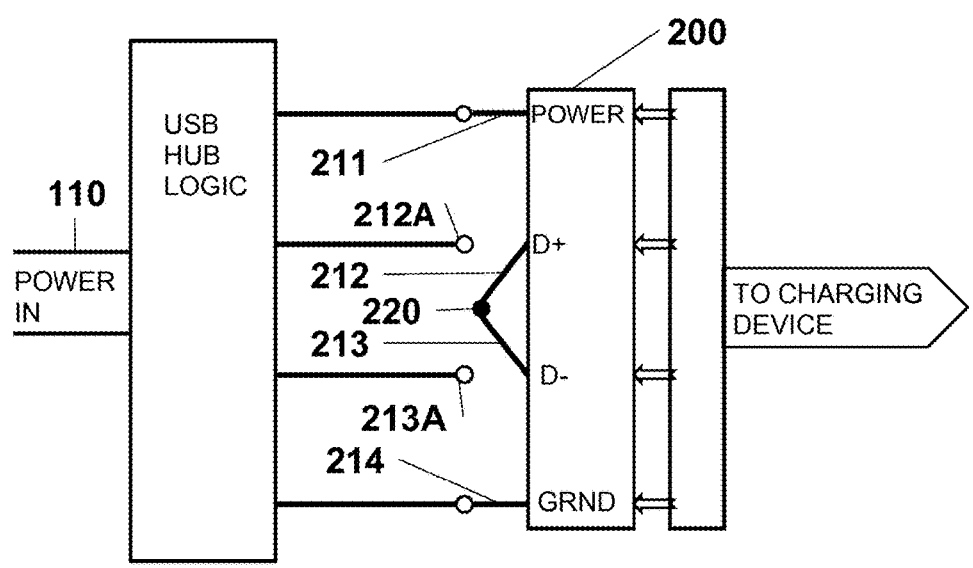
FIG. 2 Simplified view of a single dedicated USB power port

FIG. 2 To provide sufficient current for a TCD to charge effectively, a USB port is modified by stopping communications. One process is first removing (unsoldering) the D+ 212 and D− 213 pins from its circuit board at 212A, 213A. Then re-soldering the same pins 212, 213 together in a crossed manner 220 within the USB housing, to create a dedicated USB power port (DPP). The power 211 and ground 214 pins remain connected to the circuit board. The crossing of pins 212 and 213 results in a short of the data pins therefore disabling (stopping) communications between the device connected to the port and the host USB port. Without communication, the host port is then able to provide 1 A or more of charging current to the connected device.

As a detailed illustration, when a TCD is connected to a DPP 200, a handshake between the host port and TCD is also attempted. However with the data pins shorted 220, the communications cannot take place. The host device determines no communication is possible and provides the port with the maximum charging current available. The current is provided by the power adaptor (power in 110) which is able to supply 1 A or more of current to each port. Thereby allowing the TCD to receive the required current to effectively charge without the installation of additional software or circuitry.

Figure 3:
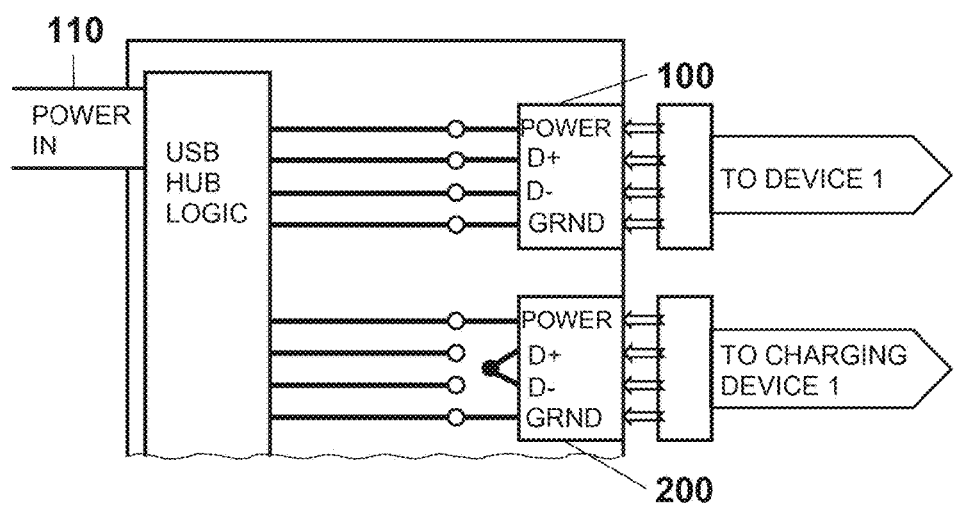
FIG. 3 Dedicated USB power port coupled with a multi-port USB powered hub

FIG. 3 (To be used as front page) The process of creating DPP can be repeated in multiple USB ports based upon the requirements of the user. DPPs within a MPH provides the capability of independently charging TCDs via dedicated ports 200 and simultaneously maintaining communications between peripherals via other non-dedicated USB ports 100 in one embodiment. Use of the device will not require additional installation of software or circuitry to allow for the charging of TCDs or communications between the peripherals. The charging current is provided by the power adaptor (power in 110) which is able to supply 1 A or more of current to each port. Furthermore the device incorporates legacy devices which do not have the same re-charging specifications as those of present day technology.

It should be understood that various changes and modifications of the embodiments shown in the drawings and described in the specifications may be made within the spirit and scope of the present invention. Accordingly, it is intended that all matter contained in the descriptions and shown in the accompanying drawings be interpreted in an illustrative and not a limiting sense. The invention is limited only as defined in claims and the equivalents thereto.

What is claimed:

1. An apparatus, comprising:
  a powered universal serial bus hub comprising:
    a first non-dedicated universal serial bus port that enables data communication and data transfer between the non-dedicated universal serial bus port and a first electronic device connected to the non-dedicated universal serial bus port; and
    a dedicated universal serial bus port that provides dedicated charging to a second electronic device connected to the dedicated universal serial bus port,
      wherein the dedicated universal serial bus port is created by unsoldering a first data pin and a second data pin from a circuit board of a second non-dedicated universal serial bus port and re-soldering the first data pin directly to the second data pin together in a crossed configuration such that communications and data transfer between the dedicated universal serial bus port and a second electronic device connected to the dedicated universal serial bus port are disabled, and
      wherein the dedicated universal serial bus port provides the dedicated charging to the second electronic device without intervention of additional circuitry or software to enable charging of the second electronic device.

2. The apparatus of claim 1, wherein the dedicated universal serial bus port provides a greater amount of charging current to the second electronic device after the first and second data pins are re-soldered together in the crossed configuration.

3. The apparatus of claim 1, wherein a ground pin and a power pin remain connected to the circuit board.

4. The apparatus of claim 1, wherein the first data pin and the second data pin reside within a universal serial bus housing of the dedicated universal serial bus port.

5. The apparatus of claim 1, wherein the crossed configuration results in a short of the first and second data pins.

6. The apparatus of claim 1, further comprising a host device that determines that no communication is possible with the second electronic device when the second electronic device is connected to the dedicated universal serial bus port.

7. The apparatus of claim 6, wherein the host device provides a maximum charging current available after determining that no communication is possible with the second electronic device.

8. The apparatus of claim 1, wherein the dedicated universal serial bus port provides at least one ampere of charging current to the second electronic device.

9. The apparatus of claim 1, further comprising a power adapter that supplies a charging current to the powered universal serial bus hub.

10. The apparatus of claim 1, wherein the first non-dedicated universal serial bus port and the dedicated universal serial bus port function independently of each other.

11. The apparatus of claim 1, wherein the powered universal serial bus hub provides communications between a host device and the first electronic device.

12. The apparatus of claim 1, wherein the dedicated universal serial bus port provides at least one ampere of charging current without interacting with software of a host device linked to the powered universal serial bus hub.

13. A hub, comprising:
a first non-dedicated universal serial bus port that enables data communication between the non-dedicated universal serial bus port and a first electronic device connected to the non-dedicated universal serial bus port; and
a dedicated universal serial bus port that provides dedicated charging to a second electronic device connected to the dedicated universal serial bus port,
wherein the dedicated universal serial bus port is created by removing a first data pin and a second data pin from a circuit board of a second non-dedicated universal serial bus port and re-soldering the first data pin directly to the second data pin together in a crossed configuration such that communications and data transfer between the dedicated universal serial bus port and a second electronic device connected to the dedicated universal serial bus port are disabled, and
wherein the dedicated universal serial bus port provides the dedicated charging to the second electronic device without intervention of additional circuitry or software to enable charging of the second electronic device.

14. The hub of claim 13, wherein the hub is a powered universal serial bus hub.

15. The hub of claim 13, wherein the dedicated universal serial bus port provides a greater amount of charging current to the second electronic device after the first and second data pins are re-soldered together in the crossed configuration.

16. The hub of claim 13, wherein the crossed configuration results in a short of the first and second data pins.

17. The hub of claim 13, further comprising a host device that determines that no communication is possible with the second electronic device when the second electronic device is connected to the dedicated universal serial bus port.

18. The hub of claim 17, wherein the host device provides a maximum charging current available after determining that no communication is possible with the second electronic device.

19. The hub of claim 13, wherein the first data pin and the second data pin reside within a universal serial bus housing of the dedicated universal serial bus port.

20. An apparatus, comprising:
a first non-dedicated universal serial bus port that enables data communication between the non-dedicated universal serial bus port and a first electronic device connected to the non-dedicated universal serial bus port; and
a dedicated universal serial bus port that provides dedicated charging to a second electronic device connected to the dedicated universal serial bus port,
wherein the dedicated universal serial bus port is created by unsoldering a first data pin and a second data pin from a circuit board of a second non-dedicated universal serial bus port and re-soldering the first data pin directly to the second data pin together in a crossed configuration such that communications and data transfer between the dedicated universal serial bus port and a second electronic device connected to the dedicated universal serial bus port are disabled, and
wherein the dedicated universal serial bus port provides the dedicated charging to the second electronic device without intervention of additional circuitry or software to enable charging of the second electronic device.

* * * * *